(12) United States Patent
Ogiso

(10) Patent No.: US 6,953,933 B1
(45) Date of Patent: Oct. 11, 2005

(54) METHOD FOR MEASURING SIZE OF MULTILAYER STRUCTURED CONTAINER

(75) Inventor: Katsuhiko Ogiso, Tokyo (JP)

(73) Assignee: Jaxel Corp., Tokyo (JP)

( * ) Notice: Subject to any disclaimer, the term of this patent is extended or adjusted under 35 U.S.C. 154(b) by 158 days.

(21) Appl. No.: 10/649,971

(22) Filed: Aug. 28, 2003

(30) Foreign Application Priority Data

Sep. 2, 2002 (JP) .............................. 2002-256631

(51) Int. Cl.⁷ .......................................... G01B 15/02
(52) U.S. Cl. ................. 250/360.1; 250/358.1
(58) Field of Search ............... 250/360.1, 358.1, 250/359.1, 361 R, 393, 363.02; 378/54, 55, 378/57, 59

(56) References Cited

U.S. PATENT DOCUMENTS

| | | | |
|---|---|---|---|
| 4,330,835 A * | 5/1982 | Gehm ...................... | 702/172 |
| 5,138,644 A * | 8/1992 | McArdle et al. .............. | 378/55 |
| 5,717,205 A * | 2/1998 | Matsumoto ................ | 250/306 |
| 5,864,601 A * | 1/1999 | Cattorini et al. ............. | 378/59 |
| 5,931,795 A * | 8/1999 | Manly et al. ............... | 600/587 |
| 6,377,654 B1 * | 4/2002 | Willems et al. .............. | 378/59 |
| 6,600,806 B1 * | 7/2003 | Istar ........................... | 378/59 |

* cited by examiner

Primary Examiner—David Porta
Assistant Examiner—Faye Polyzos
(74) Attorney, Agent, or Firm—Oliff & Berridge PLC

(57) ABSTRACT

A wall thickness of each layer or a size of a space between layers of a multilayer structured container can be easily measured with high accuracy. According to a method for measuring an inner size of a container by irradiating a multilayer structured container 2 as a target for measurement with X-rays radiated from an X-ray generating source 12 and by detecting the X-rays transmitting the container by a detector 14, the X-ray generating source 12, a slit 15, and the detector 14 perform a linear scan to the container 2 in a direction orthogonal to beams 17 in addition to disposing the slit (a double slit) 15 which narrows the X-rays transmitting the container down to the narrow beams 17 in front of the detector 14 and disposing a focal spot 12a of the X-ray generating source 12, a center of the slit 15, and a center of the detector 14 on a same straight line. The X-ray beams 17 are irradiated substantially parallel to a tangential direction of a container peripheral wall, and the X-rays transmitting the container peripheral wall are detected by the detector; thereby a thickness of each layer or the space between layers of the container peripheral wall is measured based on an obtained intensity distribution curve of damping on transmission.

13 Claims, 7 Drawing Sheets

METHOD FOR MEASURING SIZE OF MULTILAYER STRUCTURED CONTAINER

BACKGROUND OF THE INVENTION

1. Field of the Invention

The present invention relates to a method for measuring a size of a multilayer structured container suitable for measuring a thickness of a layer or a space between layers of the multilayer structured container.

2. Description of the Related Art

In order to improve heat insulation effect or safety to leakage, explosion, or the like, a multiple (multilayer) structure vessel composed of different materials is often adopted for a storage container of liquid or gas. Furthermore, a space such as a vacuum layer, an air layer, or the like is often is provided between an outer layer (an outer wall) and an inner layer (an inner wall). For such a multilayer structured container, it has been desired that a size of a wall thickness of each layer or that of the space between layers can be easily measured in order to control quality of a manufacturing process or to monitor aging due to usage.

Furthermore, as one of hydrogen-tanks for a fuel cell of an automobile, a double-layer structured container covered with a carbon fiber outside of an aluminum container has been developed. A generation of the space between the layers due to the aging has been pointed out because the container has been exposed to repeated pressure change or temperature change, and therefore, it has been desired that the space therebetween can be easily measured.

When such a multilayer structured container is inspected, a non-explosive inspection is required, and conventionally, an X-ray inspection method is generally carried out.

As shown in FIG. 8, an inner structure of a multilayer structured container 2 is inspected by the conventional X-ray inspection method in such a manner that X-rays radiated conically from an X-ray tube 1 are irradiated on the multilayer structured container 2 as an object to be inspected, and that the X-rays transmitting the multilayer structured container 2 are detected by a film 3. According to the inspection method, for example, when a space 2C exists between an outer layer 2A and an inner layer 2B, an absorption degree becomes the smallest at a portion where the X-rays transmit the space 2C to be tangent to an outer periphery of the inner layer 2B; therefore, a space is confirmed to exist at a portion where intensity of transmitting X-rays is high based on a detected result by the film 3.

However, in the conventional X-ray inspection method, the X-rays diverged conically from the X-ray tube 1 is directly taken by the film 3; therefore, it is difficult to accurately measure even a size of the space 2C or wall thicknesses of the outer and inner layers 2A and 2B although existence of the space 2C between the outer and inner layers 2A and 2B is vaguely confirmed.

SUMMARY OF THE INVENTION

Considering the aforementioned circumstances, an object of the present invention is to provide a simple method for measuring a size capable of easily measuring a wall thickness of each layer or a size of a space between layers of a multilayer structured container.

An invention of claim 1 is a method for measuring an inner size of an object to be measured by irradiating the object to be measured with a radiation radiated from a radiation generating source and by detecting the radiation transmitting the object to be measured by a detector, the method for measuring a multilayer structured container comprises: making the radiation generating source, a slit, and the detector perform a linear scan relatively to the object to be measured in an orthogonal direction to a same straight line in addition to disposing the slit which narrows down the radiation transmitting the object to be measured in front of the detector and disposing a focal spot of the radiation generating source, a center of the slit, and a center of the detector on the straight line; and measuring the inner size of the multilayer structured container as the object to be measured based on a relationship between an intensity distribution curve of damping on transmission obtained by the detector and a scan position.

According to the invention of claim 1, since the slit is disposed in front of the detector, the transmitting radiation which enters the detector can be narrowed down to a narrow beam according to a slit width. Therefore, data of damping on transmission of the radiation of a position where the narrow beam transmits can be measured with high accuracy and high resolution. Furthermore, the radiation generating source, the slit and the detector disposed on the same straight line perform a linear scan relatively to the object to be measured in an orthogonal direction to the beam, and therefore, the intensity distribution curve of damping on transmission of the radiation continuous in a scan direction is obtained. As a result, for example, when a cylindrical multilayer structured container as the object to be measured is a target for measurement, a wall thickness of each layer or a size of a space between layers can be measured with high accuracy from an intensity change of radiation beams transmitting the multilayer structured container. It should be noted that, as a scan method, the radiation generating source, the slit, and the detector can scan the object to be measured, or that the object to be measured can scan to the radiation generating source, the slit, and the detector.

An invention of claim 2 is a method for measuring an inner size of an object to be measured by irradiating the object to be measured with a radiation radiated from a radiation generating source and by detecting the radiation transmitting the object to be measured by a detector, the method for measuring a multilayer structured container comprises: making a slit and the detector perform a rotational scan relatively to the object to be measured, having a focal spot of the radiation generating source as a center, in addition to disposing the slit which narrows down the radiation transmitting the object to be measured in front of the detector and disposing the focal spot of the radiation generating source, a center of the slit, and a center of the detector on a same straight line; and measuring the inner size of the multilayer structured container as the object to be measured based on a relationship between an intensity distribution curve of damping on transmission obtained by the detector and a scan position.

According to the invention of claim 2, by disposing the slit in front of the detector, a same action of claim 1 can be obtained. Furthermore, the slit and the detector perform a rotational scan relatively to the object to be measured, having the focal spot of the radiation generating source as a center; therefore, the intensity distribution curve of damping on transmission of the radiation continuous in a direction of the rotational scan is obtained. As a result, when a cylindrical multilayer structured container as the object to be measured is a target for measurement, a wall thickness of each layer or a size of a space between layers can be measured from an intensity change of radiation beams transmitting the multilayer structured container. In this case, although a slight correction of a measured size is required, a measurement with high accuracy is possible. It should be noted that, also in this case, the slit and the detector can perform a rotational scan to the object to be measured, or that the object to be measured can perform a rotational scan to the slit and the detector.

An invention of claim 3 is a method for measuring an inner size of an object to be measured by irradiating the object to be measured with a radiation radiated from a radiation generating source and by detecting the radiation transmitting the object to be measured by a detector, the method for measuring a multilayer structured container comprises: using a radiation generating source having a line-shaped focal spot of a predetermined length as the radiation generating source; disposing a slit which narrows down the radiation transmitting the object to be measured in front of the detector; making the slit and the detector perform a linear scan relatively to the object to be measured along a direction of a length of the line-shaped focal spot of the radiation generating source; and measuring the inner size of the multilayer structured container as the object to be measured based on a relationship between an intensity distribution curve of damping on transmission obtained by the detector and a scan position.

According to the invention of claim 3, by disposing the slit in front of the detector, a same action of claim 1 can be obtained. Furthermore, a radiation generating source having the line-shaped focal spot of the predetermined length is used as the radiation generating source, and the slit and the detector perform a linear scan relatively to the object to be measured along the direction of the length of the line-shaped focal spot of the radiation generating source; therefore, the intensity distribution curve of damping on transmission of the radiation continuous in a scan direction can be obtained. As a result, when a cylindrical multilayer structured container as the object to be measured is a target for measurement, a wall thickness of each layer or a size of a space between layers can be measured with high accuracy from an intensity change of radiation beams transmitting the multilayer structured container. It should be noted that, also in this case, the slit and the detector can perform a linear scan to the object to be measured, or that the object to be measured can perform a linear scan to the slit and the detector. When the slit and the detector perform a linear scan to the object to be measured as in the former case, the radiation generating source having the line-shaped focal spot is used so that the radiation generating source itself does not have to scan, thereby a scan mechanism can be simplified.

An invention of claim 4 is a method for measuring an inner size of an object to be measured by irradiating the object to be measured with a radiation radiated from a radiation generating source and by detecting the radiation transmitting the object to be measured by a detector, the method for measuring a multilayer structured container comprises: using a linear sensor having a line-shaped detecting portion of a predetermined length along a direction of a length of a line-shaped focal spot of the radiation generating source as the detector in addition to using a radiation generating source having the line-shaped focal spot of a predetermined length as the radiation generating source; disposing a slit which narrows down the radiation transmitting the object to be measured in front of the detector; making the slit perform a linear scan to the object to be measured along the direction of the length of the line-shaped focal spot of the radiation generating source; and measuring the inner size of the multilayer structured container as the object to be measured based on a relationship between an intensity distribution curve of damping on transmission obtained by the detector and a scan position.

According to the invention of claim 4, by disposing the slit in front of the detector, a same action of claim 1 can be obtained. Furthermore, the linear sensor having the line-shaped detecting portion of the predetermined length along the direction of the length of the line-shaped focal spot of the radiation generating source is used as the detector in addition to using the radiation generating source having the line-shaped focal spot of the predetermined length as the radiation generating source, and the slit performs a linear scan relatively to the object to be measured along the direction of the length of the line-shaped focal spot of the radiation generating source; therefore, the intensity distribution curve of damping on transmission of the radiation continuous in a scan direction can be obtained. As a result, when a cylindrical multilayer structured container as the object to be measured is a target for measurement, a wall thickness of each layer or a size of a space between layers can be measured with high accuracy from an intensity change of radiation beams transmitting the multilayer structured container. It should be noted that, also in this case, the slit can perform a linear scan to the object to be measured, or that the object to be measured can perform a linear scan to the slit. When the slit performs a linear scan to the object to be measured as in the former case, the radiation generating source having the line-shaped focal spot and the linear sensor having the line-shaped detecting portion are used so that the radiation generating source and the detector themselves do not have to scan, thereby a scan mechanism can be simplified.

An invention of claim 5 is the method for measuring the multilayer structured container according to any one of claim 1 to claim 4, in the method for measuring the multilayer structured container according to any one of claim 1 to claim 4, the slit is a double slit with two slits being disposed on a front and a back of a same beam line.

According to the invention of claim 5, since the double slit is used as the slit, a certain amount of resolution can be obtained regardless of a size of the focal spot of the radiation generating source. In other words, the focal spot of the radiation generating source is ideally required to have high accuracy of a size measurement almost infinitely. However, in reality, the focal spot has an area of a certain extent, and is irradiated on the object to be measured at a divergence angle of θ; therefore, it is inevitable for the radiation to be irradiated on a large area. As a result, if only a single slit is disposed in front of the detector, an injurious scattered radiation from an unnecessarily irradiated plane is radiated in a 4π direction; furthermore, there is a possibility that the scattered radiation from an oblique direction enters the detector, and that the resolution of the size measurement is lowered. In contrast, when the double slit is disposed as in the present invention, an effect of prevention of scattering is obtained for sure; thereby the resolution is not lost.

An invention of claim 6 is the method for measuring the multilayer structured container according to any one of claim 1 to claim 5, in the method for measuring the multilayer structured container according to any one of claim 1 to claim 5, the object to be measured is a multilayer structured container having a cylindrical or a spherical container peripheral wall, said method further comprises: irradiating with the radiation substantially in parallel to a tangential direction of the cylindrical or the spherical container peripheral wall; detecting the radiation transmitting the container peripheral wall by the detector and measuring a thickness of each layer or a space between layers of the container peripheral wall based on the intensity distribution curve of damping on transmission.

According to the invention of the claim 6, when the inner size of the multilayer structured container having the cylindrical or the spherical container peripheral wall is measured, the radiation is irradiated substantially in parallel to the tangential direction of the container peripheral wall, and the radiation transmitting the container peripheral wall is detected by the detector; therefore, the thickness of each layer or the space between layers of the container peripheral wall can be measured with high accuracy.

DETAILED DESCRIPTION OF THE PREFERRED EMBODIMENT(S)

Hereinafter, embodiments of the present invention will be explained with reference to the drawings.

Figure 1:
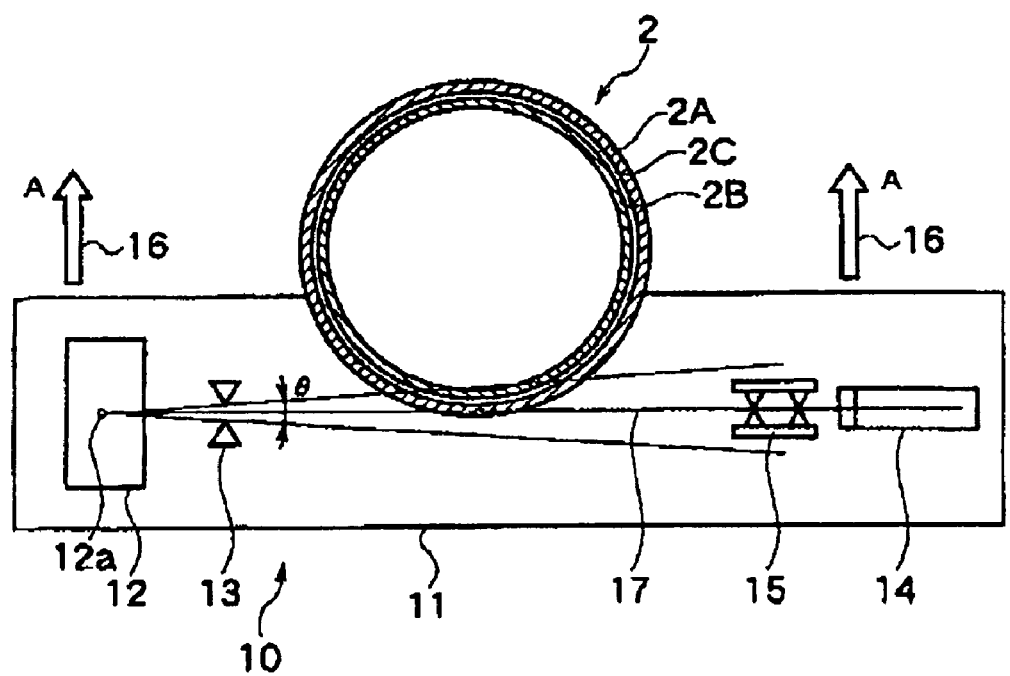
FIG. 1 is a view showing a structure of a radiation-measuring device to work a method for measuring a size of a first embodiment of the present invention.

Here, use of X-rays as a radiation will be explained as an example, however, a radiation other than it such as, for example, a radiation or a neutron radiation radiated from a radioisotope can be used. FIG. 1 is a view showing a schematic configuration of a radiation-measuring device 10 to work a method for measuring a size of a first embodiment, and a reference number 2 in the drawing denotes a cross section of a cylindrical multilayer structured container as an object to be measured. Needless to say that the object to be measured is not limited to the cylindrical multilayer structured container, but here, an explanation of a cylindrical multilayer structured container 2 will be given as an example. Incidentally, a multilayer structured container having a portion of at least a cylindrical or a spherical container peripheral wall is thought as another target for measurement.

The radiation-measuring device 10 includes an X-ray generating source (a radiation generating source) 12 which irradiates the multilayer structured container 2 as a target for measurement with X-rays, an aperture 13 which narrows down the X-rays radiated from the X-ray generating source 12 at a predetermined divergence angle θ, a detector 14 which detects the X-rays transmitting the multilayer structured container 2, and a slit 15 which narrows the X-rays transmitting the multilayer structured container 2 down to narrow beams, being disposed in front of the detector 14. A focal spot 12a of the X-ray generating source 12, a center of the slit 15, and a center of the detector 14 are disposed on a same straight line, and are mounted on a movable frame 11 of a scan mechanism (scan means) 16 (shown simply as an arrow A in the drawing).

As the X-ray generating source 12, for example, a microfocus X-ray tube having an effective focal spot size of 0.01 to 0.5 mm$^2$ is used. The aperture 13 prevents irradiating the multilayer structured container 2 as a target for inspection with extra X-rays, and has a pin hole which narrows down incident beams of Φ1, or a slit of approximately 1 mm×5 mm. A generally known scintillation counter or the like is used as the detector 14.

Furthermore, as the slit 15, a double slit with two slits being disposed on a front and a back of a same beam line is used, and the double slit serves a function as narrowing the X-rays which enter the detector 14 down to narrow beams 17. The double slit 15 has an effect to prevent a scattered radiation from the X-ray generating source 12, and therefore, a certain amount of resolution can be obtained regardless of a size of the focal spot 12a of the X-ray generating source 12. The smaller the slit width is, the higher the resolution of the detector 14 is. However, when the slit width is too small, an intensity of the X-rays which enter the detector 14 is lowered, resulting in degradation of measurement accuracy; therefore, a size of the slit 15 is, for example, 0.1 mm wide×25.4 mm long. It should be noted that the slit width is a size of a direction to make the divergence angle θ small, and that a slit length is a size of a direction orthogonal to a width direction. A width direction of the aperture 13 and a width direction of the slit 15 are set to be a same direction, and the multilayer structured container 2 is fixably disposed so that an axis is directed in an orthogonal direction to the width direction of the slit 15.

The scan mechanism 16 moves the movable frame 11 in a direction of the arrow A orthogonal to the line (namely, the X-ray beams 17 narrowed down by the slit 15) on which the focal spot 12a of the X-ray generating source 12, the center of the slit 15, and the center of the detector 14 are arranged in such a manner that the X-ray generating source 12, the aperture 13, the slit 15, and the detector 14 integrally perform a linear scan to the multilayer structured container 2. Such a linear scan makes the X-ray beams 17 effective in measurement move in parallel to an orthogonal direction to an axis direction of the cylindrical multilayer structured container 2.

Next, a method for measuring a size of the multilayer structured container using the above-structured radiation-measuring device 10 will be explained.

On measuring, first, the multilayer structured container 2 as a target for measurement is fixed to a fixed portion of the radiation-measuring device 10 so that a scan direction (the direction of the arrow A) of the scan mechanism 16 is orthogonal to the axis direction of the multilayer structured container 2. Possibly, the radiation-measuring device 10 is fixed to the multilayer structured container 2 as a target for measurement.

In this state, the X-rays are irradiated substantially in parallel to a tangential direction of a cylindrical container peripheral wall. Then, with an operation of the slit (the double slit) 15 in front of the detector 14, the transmitting X-rays which enter the detector 14 are narrowed down to the narrow X-ray beams 17 according to the slit width. Accordingly, data of damping on transmission of the X-rays about positions where the X-ray beams 17 effective in measurement transmit can be measured with high accuracy and high resolution by the detector 14. Furthermore, at the same time when the X-rays are thus irradiated, the movable frame 11 is moved in the direction of the arrow A by driving the scan mechanism 16. This integrally moves in parallel the X-ray generating source 12, the slit 15 and the detector 14, and makes the X-ray beams 17 effective in measurement scan the multilayer structured container 2. Therefore, an intensity distribution curve of damping on transmission of the X-rays continuous in the scan direction can be obtained.

Figure 2:
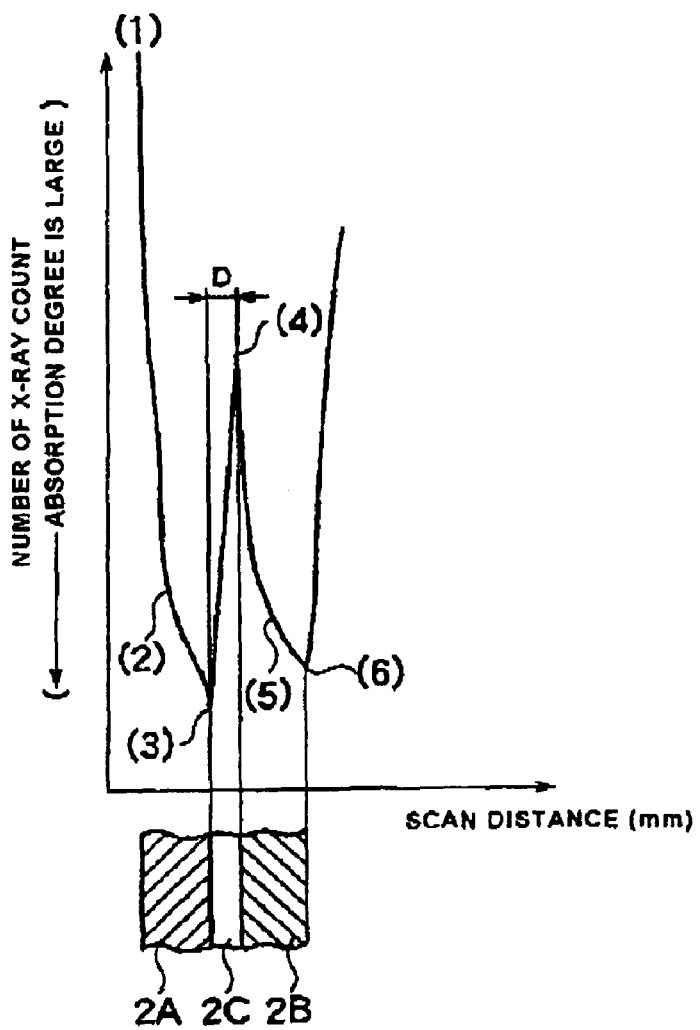
FIG. 2A is an intensity distribution curve of damping on transmission obtained by a detector of the device.
FIG. 2B is a view showing scan positions of beams from which respective values of the intensity distribution curve of damping on transmission are obtained.
Figure 2:
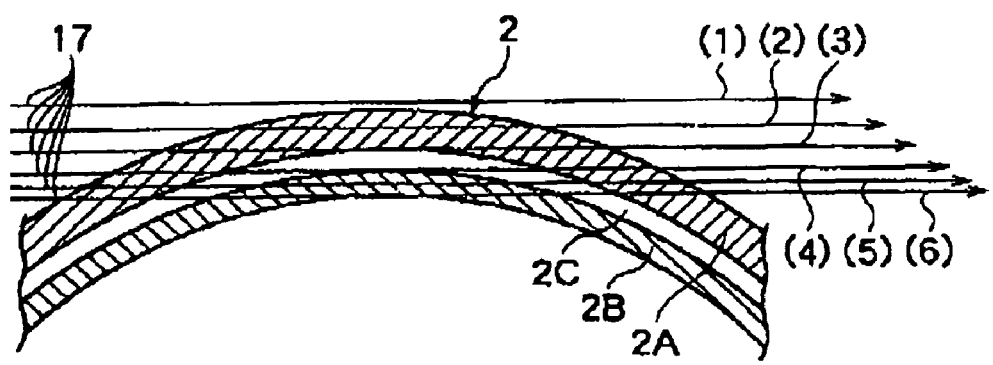

FIGS. 2A and 2B are explanatory views of measured data; FIG. 2A shows an example of an intensity distribution curve of damping on transmission obtained by detection, and FIG. 2B shows a scan position of X-ray beams showing a corresponding relationship between respective portions of the intensity distribution curve of damping on transmission. A vertical axis of a graph showing the intensity distribution curve of damping on transmission in FIG. 2A shows counting rates (namely, values showing an absorption degree or a transmission degree of the X-rays) of the X-rays, and a horizontal axis thereof shows a scan distance (a scan position). A scan starts from (1) and continues in (2), (3), (4), (5), to (6) in this order shown in FIG. 2B.

A step from (1) to (2): when the scan starts from an outside of the multilayer structure container 2, the X-ray beams directly enter the detector 14 without damping initially, and an amount of detected X-rays is measured maximum. When the scan position reaches an outer layer 2A of the container peripheral wall, an amount of damping (the absorption degree) gradually becomes large and the amount of the detected X-rays decreases. This is because an absorption distance of the X-rays transmitting the container peripheral wall increases. A process of decreasing the amount of the detected X-rays is measured as a downward curve shown in (2) of FIG. 2A.

A step from (2) to (3): The amount of the detected X-rays gradually decreases; when the scan position reaches a position [a position of (3)] tangent to an inner periphery of the outer layer 2A, the absorption distance of the outer layer 2A becomes maximum, and therefore, the amount of the detected X-rays becomes minimum. This step is measured as a downward projecting peak shown in (3) of FIG. 2A.

A step from (3) to (4): After the scan position passes the position [the position of (3)] tangent to the inner periphery of the outer layer 2A, the amount of the detected X-rays gradually increases because the absorption distance by the outer layer 2A gradually decreases therefrom.

A step from (4) to (5): Right after the scan position reaches a position [a position of (4)] tangent to an outer periphery of an inner layer 2B, the amount of the detected X-rays gradually decreases again because the distance transmitting the inner layer 2B gradually increases again. Accordingly, a step when the scan position reaches the position tangent to the outer periphery of the inner layer 2B is measured as an upward projecting peak shown in (4) of FIG. 2A.

A step from (5) to (6): The amount of the detected X-rays decreases until the scan position reaches a position [a position of (6)] tangent to an inner periphery of the inner layer 2B, and the amount of the detected X-rays increases again right after the scan position reaches the position tangent to the inner periphery of the inner layer 2B. Accordingly, a step when the scan position reaches the position tangent to the inner periphery of the inner layer 2B is measured as a downward projecting peak shown in (6) of FIG. 2A.

The measured data shown in FIG. 2A is obtained by scanning thus, and therefore, for example, a size of a gap 2C between the outer layer 2A and the inner layer 2B can be measured by analyzing the measured data. In other words, from the measured data shown in FIGS. 2A and 2B, the downward projecting peak of (3) and the upward projecting peak (4) are detected so as to calculate a scan distance D between the peaks. For example, when scanned by a stepping motor, a difference between the number of stepping pulses at the position of the downward projecting peak and the number of stepping pulses at the position of the upward projecting peak is calculated, and the difference therebetween is multiplied by a scan distance per pulse, thereby the scan distance D between the peaks is calculated. Since the scan distance D is equivalent to a distance between the inner periphery of the outer layer 2A and the outer periphery of the inner layer 2B, the size of the gap 2C between the outer layer 2A and the inner layer 2B is measured. In other words, the size of the space between the layers is easily measured with high accuracy from data of intensity changes corresponding to the scan positions of the X-ray beams transmitting the multilayer structured container 2.

Incidentally, when the above-mentioned measurement is performed, a series of processes of control of the scan, irradiation of the X-rays, acquisition of the intensity distribution curve of damping on transmission, detection of the peaks at the intensity distribution curve of damping on transmission, and calculation of the gap 2C between the layers can be performed by people, however, these processes can be automatically performed by a computer. Furthermore, the measurement of the size of the gap 2C between the layers from the intensity distribution curve of damping on transmission in FIG. 2A has been described in the above explanation, however, a wall thickness of the inner layer 2B can be measured from the scan distance between the peaks (4) and (6). Furthermore, a wall thickness of the outer layer 2A can also be similarly measured if feature points in the intensity distribution curve of damping on transmission have been clearly defined.

Next, other embodiments will be explained. Same reference numbers in the drawings will be given to same components of the radiation-measuring device 10 in FIG. 1, and explanations thereof will be omitted.

Figure 3:
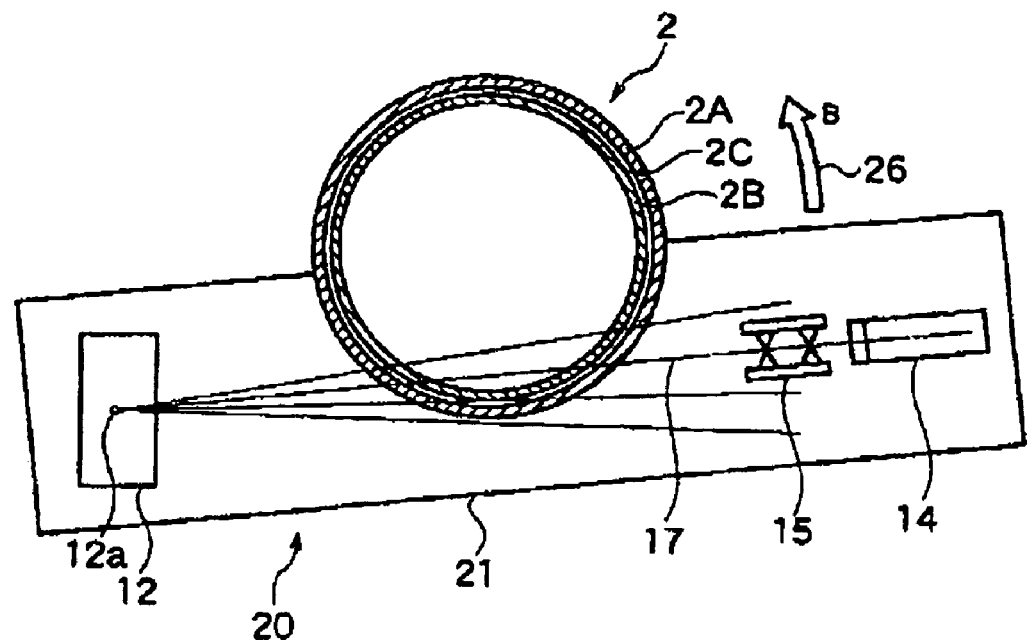
FIG. 3 is a view showing a structure of a radiation-measuring device to work a method for measuring a size of a second embodiment of the present invention.

FIG. 3 is a view showing a schematic configuration of a radiation-measuring device 20 to work a method for measuring a size of a second embodiment.

The radiation-measuring device 10 to work the method for measuring the size of the first embodiment is so structured that the X-ray generating source, the slit, and the detector perform a linear scan to the object to be measured. However, in the radiation-measuring device 20, in addition to disposing a focal spot 12a of an X-ray generating source 12, a center of a slit 15, and a center of a detector 14 on a same straight line, the slit 15 and the detector 14 perform a rotational scan relatively to the multilayer structured container 2 as an object to be measured, having the focal spot 12a of the X-ray generating source 12 as a center, as shown in an arrow B by a rotational scan mechanism 26 (shown simplified by the arrow B). The slit 15 and the detector 14 are mounted on a rotary-arm-type movable frame 21 of the rotational scan mechanism 26, and the movable frame 21 is rotationally provided having the focal spot 12a of the X-ray generating source 12 as a center.

According to the method for measuring the size by the radiation-measuring device 20, the slit 15 and the detector 14 perform a rotational scan relatively to the multilayer structured container 2 as a target for measurement, having the focal spot 12a of the X-ray generating source 12 as a center, thereby data of X-ray damping continuous in a direction of the rotational scan can be obtained. Therefore, as well as the method of the first embodiment, a wall thickness of each layer or a size of a space between layers can be measured from an intensity change of the X-ray beams transmitting the multilayer structured container 2. Incidentally, in this case, a slight correction of a measured size may often be required.

Figure 4:
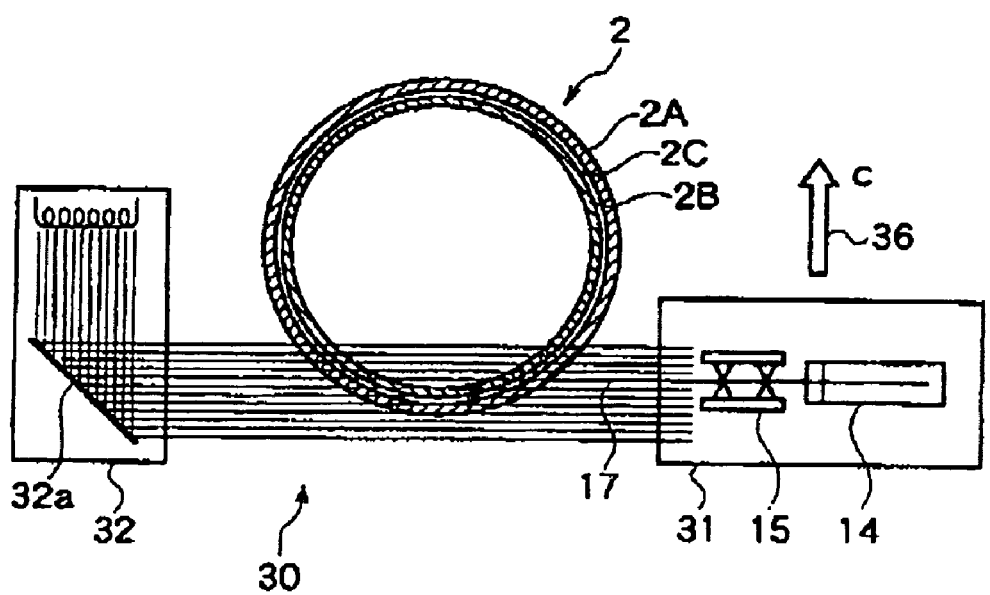
FIG. 4 is a view showing a structure of a radiation-measuring device to work a method for measuring a size of a third embodiment of the present invention.

FIG. 4 is a view showing a schematic configuration of a radiation-measuring device 30 to work a method for measuring a size of a third embodiment.

In the radiation-measuring device 30, an X-ray generating source 32 having line-shaped focal spots 32a equivalent to a length of a scan distance requiring for measurement is used as an X-ray generating source. Furthermore, by a linear scan mechanism 36 (shown simplified by an arrow C), a slit 15 and a detector 14 perform a linear scan relatively to the multilayer structured container 2 as an object to be measured as shown in the arrow C along a direction of lengths of the line-shaped focal spots 32a of the X-ray generating source 32. The slit 15 and the detector 14 are mounted on a movable frame 31 of the linear scan mechanism 36, and the movable frame 31 is movably provided in a direction of the arrow C.

According to the method for measuring the size by the radiation-measuring device 30, the X-ray generating source 32 having the line-shaped focal spots 32a of predetermined lengths is used as an X-ray generating source, and the slit 15 and the detector 14 perform a linear scan relatively to the multilayer structured container 2 along the direction of the lengths of the line-shaped focal spots 32a of the X-ray generating source 32; therefore, an intensity distribution curve of damping on transmission of the X-rays continuous in a scan direction can be obtained. As a result, as well as the method for measuring the size of the first embodiment, a wall thickness of each layer or a size of a space between layers can be measured with high accuracy from an intensity change of the X-ray beams transmitting the multilayer structured container 2. Furthermore, in this case, the X-ray generating source 32 having the line-shaped focal spots 32a is used so that the X-ray generating source 32 itself does not have to scan, thereby the scan mechanism 36 can be simplified.

Figure 5:
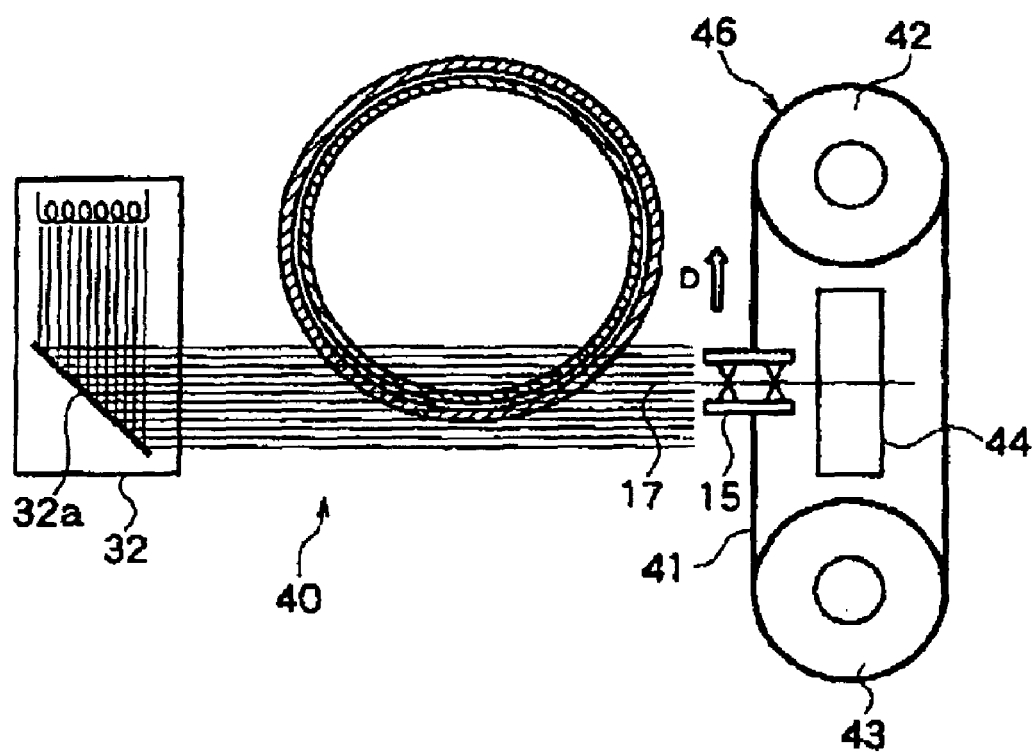
FIG. 5 is a view showing a structure of a radiation-measuring device to work a method for measuring a size of a fourth embodiment of the present invention.

FIG. 5 is a view showing a schematic configuration of a radiation-measuring device 40 to work a method for measuring a size of a fourth embodiment.

In the radiation-measuring device 40, in addition to using an X-ray generating source 32 having line-shaped focal spots 32a equivalent to a length of a scan distance requiring for measurement as an X-ray generating source, a linear sensor 44 having a line-shaped detecting portion of a predetermined length along a direction of lengths of the line-shaped focal spots 32a of the X-ray generating source 32 is used as a detector. Furthermore, by a linear scan mechanism 46, only a slit 15 performs a linear scan relatively to the multilayer structured container 2 as an object to be measured as shown in an arrow D along a direction of lengths of the line-shaped focal spots 32a of the X-ray generating source 32. The slit 15 is fixed on, for example, a belt 41 of the belt-driven type linear scan mechanism 46, and the slit 15 can be moved in a direction of the arrow D by driving the belt 41 wound around pulleys 42, 43 on both ends.

According to the method for measuring the size by the radiation-measuring device 40, in addition to using the X-ray generating source 32 having the line-shaped focal spots 32a as an X-ray generating source, the linear sensor 44 having the line-shaped detecting portion is used as a detector, and the slit 15 performs a linear scan relatively to the multilayer structured container 2 along the direction of the lengths of the line-shaped focal spots 32a of the X-ray generating source 32; therefore, an intensity distribution curve of damping on transmission of the X-rays continuous in a scan direction can be obtained. As a result, as well as the method for measuring the size of the first embodiment, a wall thickness of each layer or a size of a space between layers can be measured with high accuracy from an intensity change of the X-ray beams transmitting the multilayer structured container 2. Furthermore, in this case, the X-ray generating source 32 having the line-shaped focal spots 32a and the linear sensor 44 having the line-shaped detecting portion are used so that the X-ray generating source 32 and the linear sensor 44 themselves do not have to scan, thereby the scan mechanism 46 can be further simplified.

Incidentally, such cases that a measuring component (the X-ray generating source, the slit, the detector) side scans the object to be measured are described in the aforementioned embodiments; however, a same effect can be obtained when a side of the object to be measured scans measuring components.

Furthermore, such cases that the multilayer structured container 2 composed of a double-layer is a target for measurement are explained above, however, the method for measuring the size of the present invention can be applied to a multilayer structured container composed of a triple-layer or more. In other words, a measurement of respective thicknesses and spaces between layers having a complicated structure such as a triple-layer or a quadruple-layer is possible because an intensity distribution of cyclic absorption or damping similar to the above-explained one is obtained.

Figure 6:
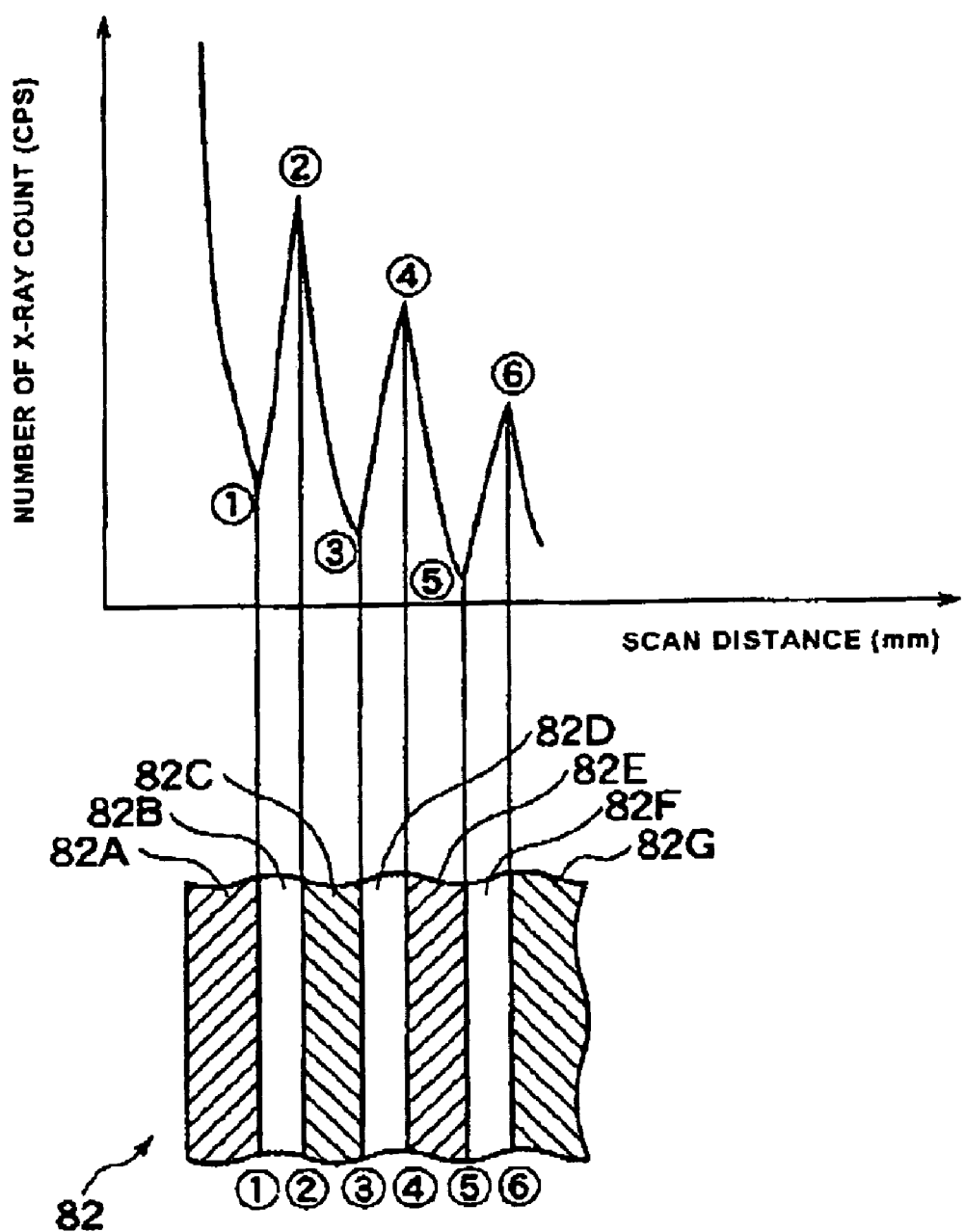
FIG. 6 is a view showing an example of an intensity distribution curve of damping on transmission when a quadruple-layered multilayer structured container is measured by the method for measuring the size of the present invention.

FIG. 6 shows an intensity distribution curve of damping on transmission of a case of a quadruple-layered multilayer structured container as an example. A cylindrical peripheral wall of a multilayer structured container 82 is composed of a quadruple-layer having a first layer 82A, a second layer 82C, a third layer 82E, and a fourth layer 82G from outside, and spaces between the respective layers are 82B, 82D, and 82F; in this case, sizes of the respective spaces 82B, 82D, and 82F can be measured as a distance between respective peaks in an intensity distribution curve of damping on transmission. In other words, the size of the space 82B between the first layer 82A and the second layer 82C can be measured as a scan distance between a downward projecting peak (1) and an upward projecting peak (2) immediately thereafter; the size of the space 82D between the second layer 82C and the third layer 82E can be measured as a scan distance between a downward projecting peak (3) and an upward projecting peak (4) immediately thereafter; the size of the space 82F between the third layer 82E and the fourth layer 82G can be measured as a scan distance between a downward projecting peak (5) and an upward projecting peak (6) immediately thereafter. Furthermore, a thickness of the second layer 82C can be measured as a scan distance between the peaks (2) and (3), and a thickness of the third layer 82E can be measured as a scan distance between the peaks (4) and (5).

Figure 7:
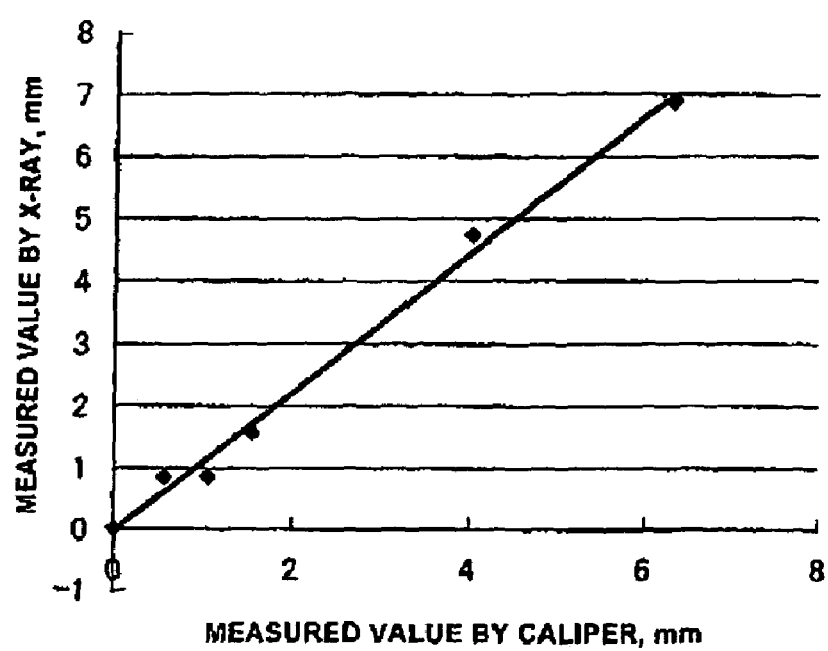
FIG. 7 is a view showing a result of an examination of the method for measuring the size of the present invention and actual measured values by a caliper.
Figure 8:
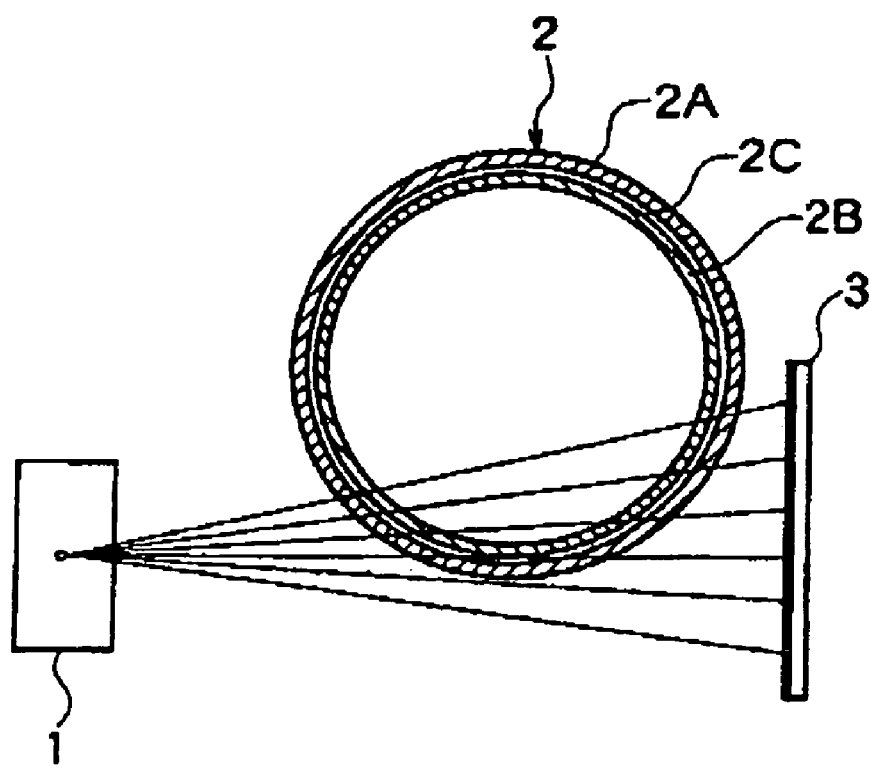
FIG. 8 is an explanatory view of a conventional radioscopy inspection method.

FIG. 7 is a view showing a test result to prove accuracy of the method for measuring the size according to the present invention. Here, a result of previously measuring an inner size according to the method for measuring the size of the present invention is compared with a result of actually measuring the inner size by a caliper after breaking an object as a target for measurement thereafter. The drawing tells that measured values by the caliper correspond well to detected values (the present invention) by the X-rays.

As explained above, according to the present invention, radiations which enter the detector are narrowed down to narrow beams by disposing the slit in front of the detector, and the object to be measured and the measuring components (a radiation generating source, the slit, the detector, and the like) can scan relatively to each other; therefore, a wall thickness of each layer or the size of the space between layers of the multilayer structured container can be easily measured. Furthermore, since only a scan means should be provided in addition to the measuring components, a structure of the device can be simplified.

What is claimed is:

1. A method for measuring an inner size of an object to be measured by irradiating the object to be measured with a radiation radiated from a radiation generating source and by detecting the radiation transmitting the object to be measured by a detector, the method for measuring a multilayer structured container comprising:

making the radiation generating source, a slit, and the detector perform a linear scan relatively to the object to be measured in an orthogonal direction to a same straight line in addition to disposing the slit which narrows down the radiation transmitting the object to be measured in front of the detector and disposing a focal spot of the radiation generating source, a center of the slit, and a center of the detector on the straight line; and measuring the inner size of the multilayer structured container as the object to be measured based on a relationship between an intensity distribution curve of damping on transmission obtained by the detector and a scan position.

2. A method for measuring an inner size of an object to be measured by irradiating the object to be measured with a radiation radiated from a radiation generating source and by detecting the radiation transmitting the object to be measured by a detector, the method for measuring a multilayer structured container comprising:

making a slit and the detector perform a rotational scan relatively to the object to be measured, having a focal spot of the radiation generating source as a center, in addition to disposing the slit which narrows down the radiation transmitting the object to be measured in front of the detector and disposing the focal spot of the radiation generating source, a center of the slit, and a center of the detector on a same straight line; and measuring the inner size of the multilayer structured container as the object to be measured based on a relationship between an intensity distribution curve of damping on transmission obtained by the detector and a scan position.

3. A method for measuring an inner size of an object to be measured by irradiating the object to be measured with a radiation radiated from a radiation generating source and by detecting the radiation transmitting the object to be measured by a detector, the method for measuring a multilayer structured container comprising:

using a radiation generating source having a line-shaped focal spot of a predetermined length as the radiation generating source;

disposing a slit which narrows down the radiation transmitting the object to be measured in front of the detector;

making the slit and the detector perform a linear scan relatively to the object to be measured along a direction of a length of the line-shaped focal spot of the radiation generating source; and measuring the inner size of the multilayer structured container as the object to be measured based on a relationship between an intensity distribution curve of damping on transmission obtained by the detector and a scan position.

4. A method for measuring an inner size of an object to be measured by irradiating the object to be measured with a radiation radiated from a radiation generating source and by detecting the radiation transmitting the object to be measured by a detector, the method for measuring a multilayer structured container comprising:

using a linear sensor having a line-shaped detecting portion of a predetermined length along a direction of a length of a line-shaped focal spot of the radiation generating source as the detector in addition to using a radiation generating source having the line-shaped focal spot of a predetermined length as the radiation generating source;

disposing a slit which narrows down the radiation transmitting the object to be measured in front of the detector;

making the slit perform a linear scan to the object to be measured along the direction of the length of the line-shaped focal spot of the radiation generating source; and measuring the inner size of the multilayer structured container as the object to be measured based on a relationship between an intensity distribution curve of damping on transmission obtained by the detector and a scan position.

5. The method for measuring the multilayer structured container according to claim 1, wherein the slit is a double slit with two slits being disposed on a front and a back of a same beam line.

6. The method for measuring the multilayer structured container according to claim 1, wherein the object to be measured is a multilayer structured container having a cylindrical or a spherical container peripheral wall, said method further comprising:

irradiating with the radiation substantially in parallel to a tangential direction of the cylindrical or the spherical container peripheral wall;

detecting the radiation transmitting the container peripheral wall by the detector; and measuring a thickness of each layer or a space between layers of the container peripheral wall based on the intensity distribution curve of damping on transmission.

7. The method for measuring the multilayer structured container according to claim 2, wherein the slit is a double slit with two slits being disposed on a front and a back of a same beam line.

8. The method for measuring the multilayer structured container according to claim 3, wherein the slit is a double slit with two slits being disposed on a front and a back of a same beam line.

9. The method for measuring the multilayer structured container according to claim 4, wherein
the slit is a double slit with two slits being disposed on a front and a back of a same beam line.

10. The method for measuring the multilayer structured container according to claim 2, wherein
the object to be measured is a multilayer structured container having a cylindrical or a spherical container peripheral wall,
said method further comprising:
irradiating with the radiation substantially in parallel to a tangential direction of the cylindrical or the spherical container peripheral wall;
detecting the radiation transmitting the container peripheral wall by the detector; and
measuring a thickness of each layer or a space between layers of the container peripheral wall based on the intensity distribution curve of damping on transmission.

11. The method for measuring the multilayer structured container according to claim 3, wherein
the object to be measured is a multilayer structured container having a cylindrical or a spherical container peripheral wall,
said method further comprising:
irradiating with the radiation substantially in parallel to a tangential direction of the cylindrical or the spherical container peripheral wall;
detecting the radiation transmitting the container peripheral wall by the detector; and
measuring a thickness of each layer or a space between layers of the container peripheral wall based on the intensity distribution curve of damping on transmission.

12. The method for measuring the multilayer structured container according to claim 4, wherein
the object to be measured is a multilayer structured container having a cylindrical or a spherical container peripheral wall,
said method further comprising:
irradiating with the radiation substantially in parallel to a tangential direction of the cylindrical or the spherical container peripheral wall;
detecting the radiation transmitting the container peripheral wall by the detector; and
measuring a thickness of each layer or a space between layers of the container peripheral wall based on the intensity distribution curve of damping on transmission.

13. The method for measuring the multilayer structured container according to claim 5, wherein
the object to be measured is a multilayer structured container having a cylindrical or a spherical container peripheral wall,
said method further comprising:
irradiating with the radiation substantially in parallel to a tangential direction of the cylindrical or the spherical container peripheral wall;
detecting the radiation transmitting the container peripheral wall by the detector; and
measuring a thickness of each layer or a space between layers of the container peripheral wall based on the intensity distribution curve of damping on transmission.

* * * * *